United States Patent
Ronen et al.

[11] Patent Number: 5,905,736
[45] Date of Patent: May 18, 1999

[54] METHOD FOR THE BILLING OF TRANSACTIONS OVER THE INTERNET

[75] Inventors: Yzhak Ronen, West Windsor, N.J.; Silvio Tavares, Newton, Mass.

[73] Assignee: AT&T Corp, Middletown, N.J.

[21] Appl. No.: 08/636,109

[22] Filed: Apr. 22, 1996

[51] Int. Cl.$^6$ .......................... H04M 15/00; H04L 12/28; H04L 12/56

[52] U.S. Cl. .......................... 370/546; 370/352; 379/144; 379/127; 379/112

[58] Field of Search ...................................... 379/114, 112, 379/115, 93.12, 126, 127, 121, 201, 207, 221, 119, 116, 111; 380/4; 370/546, 352, 389; 395/187.01, 500

[56] References Cited

U.S. PATENT DOCUMENTS

| | | | |
|---|---|---|---|
| 5,692,132 | 11/1997 | Hogan | 395/227 |
| 5,699,416 | 12/1997 | Atkins | 379/127 |
| 5,737,414 | 4/1998 | Walker et al. | 380/4 |
| 5,745,556 | 4/1998 | Ronen | 379/127 |

*Primary Examiner*—Jason Chan
*Assistant Examiner*—Melissa Kay Carman
*Attorney, Agent, or Firm*—Stephen M. Gurey

[57] ABSTRACT

A method for performing centralized billing for transactions conducted over the Internet between a user and an Internet Service Provider (ISP) (106) through an Internet Access Provider (IAP) (104) is disclosed. Upon connection of the user's terminal (101) to the IAP, the IAP transmits to a billing platform (108) a message that associates the user's identity and the temporary Internet Protocol (IP) address that is assigned by the IAP to the user's session for use by to that user's terminal. In response to a chargeable transaction with an ISP, the ISP transmits to the billing platform the IP address of the user making the transaction and the charge for the transaction. The charges for all such transactions are accumulated by a transaction server (109) and stored in an account on an associated database (110) identified with the IP address of the requesting terminal. At the end of the user's session, the charges for all the transactions during the session that are stored on the transaction server database in the account identified with the IP address, are charged to an account associated with the user's identity that is stored on a database (112) of a billing server (111) by cross-referencing the IP address to the user's identity from the previously received and stored message.

53 Claims, 5 Drawing Sheets

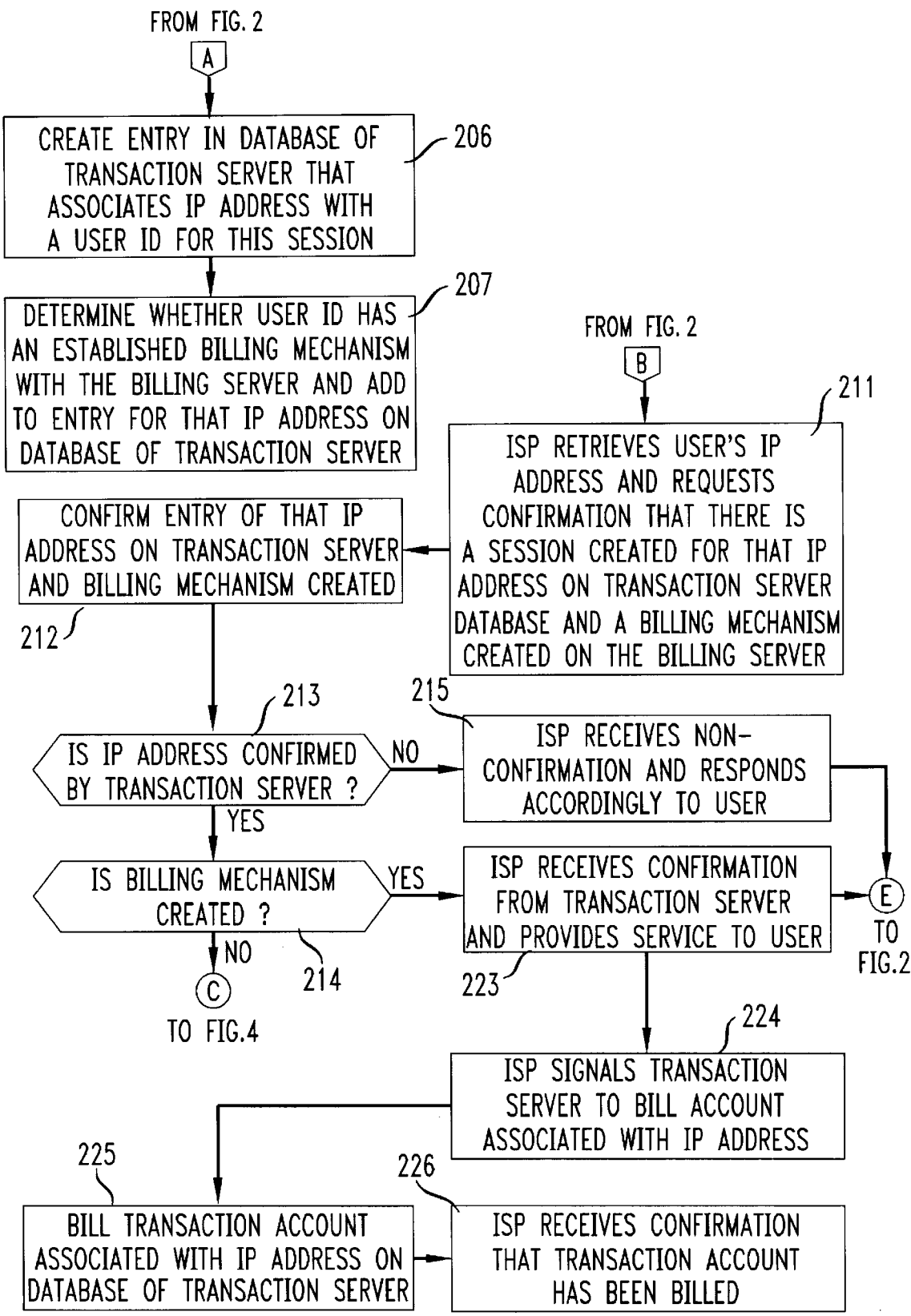

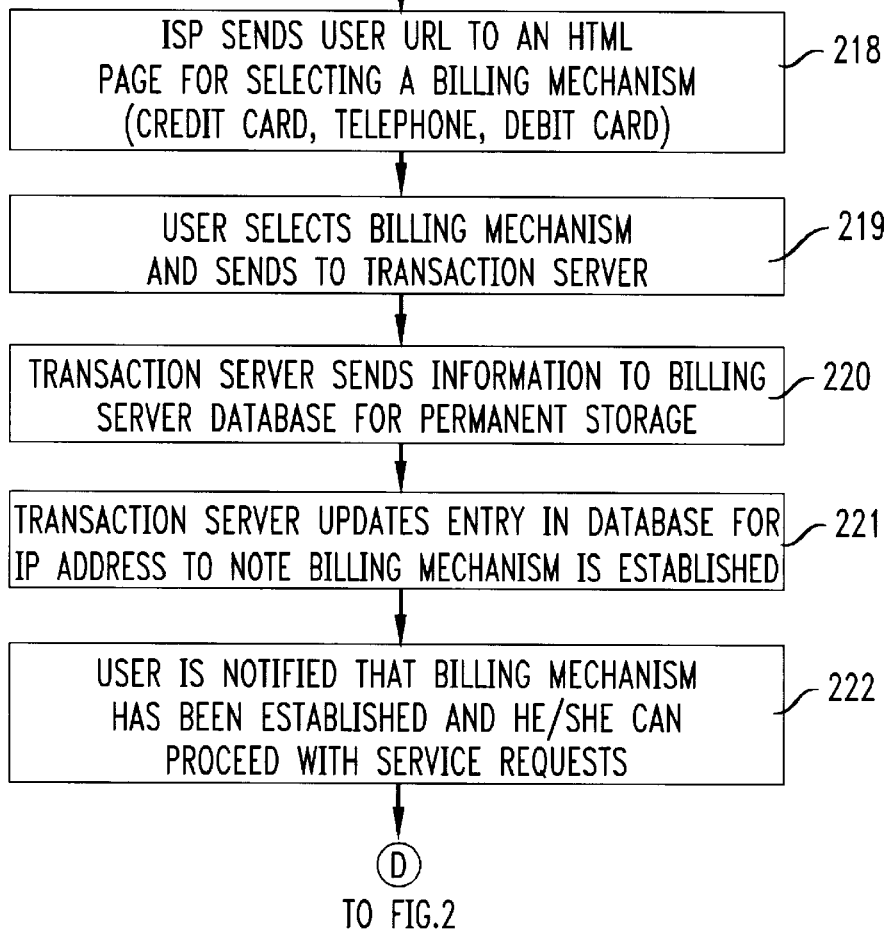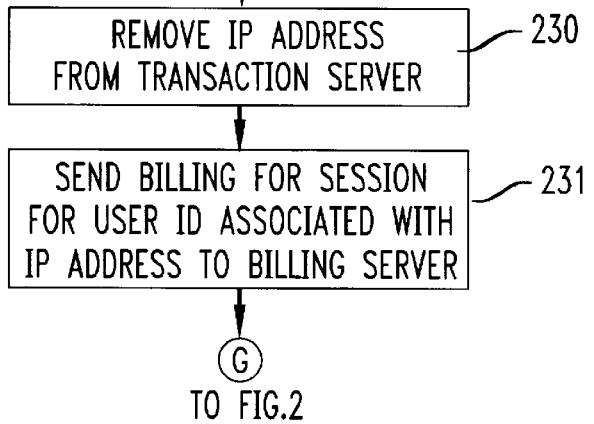

METHOD FOR THE BILLING OF TRANSACTIONS OVER THE INTERNET

TECHNICAL FIELD

This invention relates to a method of billing for information, interactive services, software, or tangible or intangible goods transacted for or provided over the Internet.

BACKGROUND OF THE INVENTION

The Internet today has become the gateway for connected users to access a plethora of information and interactive services. In addition, the Internet can provide users a mechanism for ordering various goods and services, including tickets and merchandise, that will later be delivered by conventional transport means, and for ordering and receiving non-tangible goods that can be delivered in digital format directly over the Internet coincident with the transaction. Example of the latter may include software, music, video, and even electronic cash.

Billing for information, interactive services, tangible goods or services ordered over the Internet and provided conventionally, or non-tangible goods delivered over the Internet, which are provided from a plurality of different sources, requires the user to establish a financial relationship with each of the many different Internet Service Providers (ISPs). In many instances, the relationship may be very fleeting if the user wants to only access information or an interactive service from an ISP once or twice, or only on a very occasional basis. Establishing such a relationship with a multitude of different ISPs is inconvenient and will generally require furnishing the ISP with some type of payment mechanism, such as supplying a credit card number, in order for the information, service, and/or goods to be provided via the Internet or other transport mechanism. In view of the non-secure nature of the Internet, users generally do not wish to provide their credit card number to an ISP unless it can be done in a secure fashion.

In a co-pending patent application of one of the co-inventors herein, Ser. No. 08/532,336, filed Sep. 22, 1995, now U.S. Pat. No. 5,745,556 issued Apr. 28, 1998, a method for providing a centralized billing mechanism through the phone company is disclosed. As disclosed therein, a user places a real or virtual telephone call using, for example, a 900-number to reach the ISP to whom he or she is connected via the Internet. The ISP then associates the received telephone call with the IP address of the Internet connection by means of identifiers sent via the Internet and the phone connection before providing service to the user. The ISP, through arrangements with the telephone company, can set user charges for the 900-number call to an amount appropriate to the value of the information or services provided on the Internet. The user thus pays for the information and/or services by means of payment to the phone company for the 900-number call, and the provider receives payment for these services and/or information from the phone company. The user thus need not establish any financial relationship with the provider but deals only with the phone company, and the ISP is able to interact directly with the trusted phone company to receive payment for the information and/or services provided to a plurality of different accessing users. Such arrangement requires a separate real or virtual connection through the phone company to effect billing.

An object of the present invention is to provide a centralized billing mechanism which directly handles the billing functions for all chargeable transactions made by a user through different ISPs and which is essentially transparent to the user in his or her interactions with the various ISPs.

SUMMARY OF THE INVENTION

By using the present invention, billing is centralized for information and/or services, or for any type of transaction conducted over the Internet by users connected through an Internet Access Provider (IAP) to one or more ISPs. In accordance with the invention, the Internet Protocol (IP) address that is assigned to the user by the IAP upon connection, is transmitted to a billing platform together with the associated identity of the user, which is known to the IAP through normal log-on procedures. In response to a chargeable transaction, the ISP transmits to the billing platform the IP address identity of the user making the transaction and the cost associated with the transaction. The billing server then cross-references the IP address associated with the cost of the transaction received from the ISP with the IP-address/user-identity relationship received from the IAP to properly charge an established account of the user for the transaction. This account will likely be established by the user prior to the execution of the transaction for billing in a predetermined manner to, for example, a user's selected credit card, a user's debit card, a user's telephone account associated with his or her phone number, a user's merchant credit card, or other billing mechanism. Billing to a particular credit card, debit card, merchant credit card, etc., can be selectively determined, for example, by the type of transaction, the amount of the transaction, the identity of the provider, or a combination of any of these.

If the user is not a regular user of chargeable Internet services but rather is a casual user who has not pre-established a billing mechanism for such transactions, he or she may access the IAP through a 900-number, knowing before-hand that the cost for the transaction will be reflected as a charge for the 900-number telephone call on his or her telephone bill. The IAP, when accessed through the 900-number, passes the Automatic Number Identification (ANI) of the calling terminal to the billing platform together with the assigned IP address and the identity of the user. The billing platform then charges the user's calling telephone number in response to the signal from the ISP to charge an account associated with the requesting IP address, the latter being cross-referenced by the billing platform to the ANI that was provided by the IAP with the associated user's assigned IP address.

In the disclosed embodiment of the present invention, billing to a user's account is effected in a two-step process. A user is likely to engage in plural chargeable transactions to the same ISP or different ISPs during a common session during which he or she is connected to the Internet through the IAP. During such a session the user is assigned the same IP address. The billing platform thus includes a transaction server and a billing server, each with a separate associated database. Billing for each separate transaction is first effected in the transaction server, which stores on its database the charge for each transaction associated with the same IP address. At the conclusion of the session, which may consist of one or a plurality of transactions, the account on the transaction server database associated with the IP address is cross-referenced to the identity of the user that has been provided with the associated IP address to the transaction server by the IAP. The user's account on the database of the billing server is then charged according to the billing mechanism established by the user for each type of transaction within the session. For a casual user who has not established a billing mechanism and who accesses the IAP using a 900-number, an ANI signal received by the transaction server from the IAP is passed to the billing server for charging for each transaction within the session to the user's calling telephone number.

BRIEF DESCRIPTION OF THE DRAWINGS

FIGS. 2, 3 4 and 5 together show a flow chart that illustrates the interaction between the user, the IAP, the ISP and a billing platform for billing for transactions conducted by the user on the Internet.

DETAILED DESCRIPTION

Figure 1:
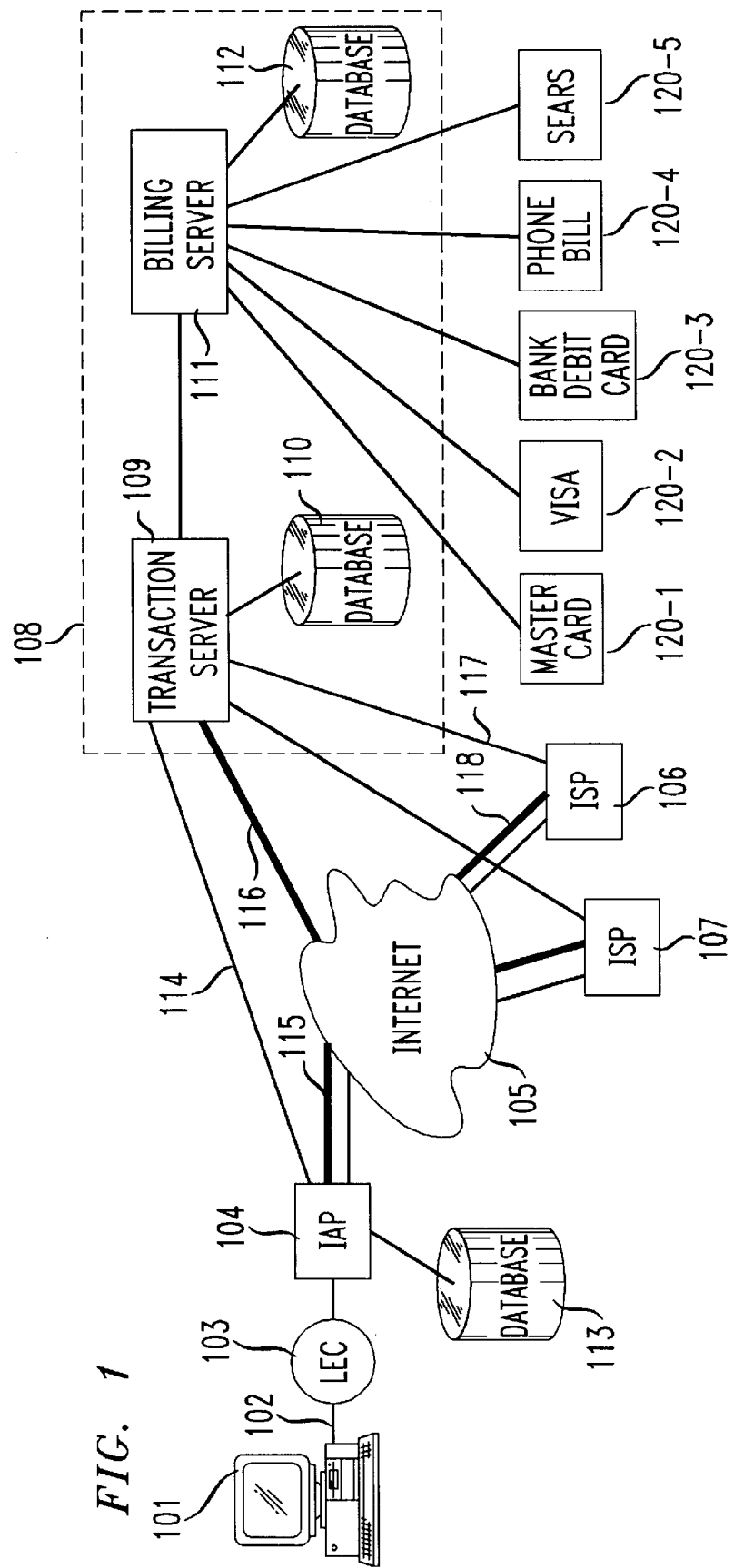
FIG. 1 is a block diagram showing the network elements for providing the centralized billing functionality of the present invention for transactions conducted by a user through an Internet Access Provider to one of a plurality of different Internet Service Providers connected to the Internet.

With reference to FIG. 1 a user at terminal 101 is connected over telephone line 102 through his or her Local Exchange Carrier (LEC) 103 to IAP 104, through which access to the Internet 105 is made. By inputting the URL address of the Internet Service Provider with which the user desires to interact, the user may be connected to various ISPs, such as 106 and 107. These ISPs may provide information, interactive services, or may provide the mechanism through which the user can order non-tangible goods that can be delivered over the Internet to the user. An example of the latter could be software, music, or video information. These ISPs can also offer the user the ability to order tickets, or tangible goods from a retailer or Internet-order company associated with the ISP, or from a plurality of different such companies. Access to some of the information providers will be without cost to the user, while access to others may have an associated cost in order for the user to access the information. A transaction that involves the delivery, via the Internet or otherwise, of tangible or non-tangible merchandise will most likely also have an associated cost for which the user must be charged before or after the merchandise is delivered.

Upon being connected to IAP 104, the user is assigned an IP address that is temporarily used as an addressing mechanism and is associated with that user for a session that lasts as long as his or her terminal remains continuously connected to IAP 104. Thus the transmissions from all ISPs to terminal 101 in response to a request by the user are addressed to that particular IP address that is uniquely associated with IAP 104 only for the session. Database 113, associated with IAP 104, stores the temporary relationship between the identity of the user, as provided by the user and authenticated by IAP 104 when the user establishes communication with IAP 104, and the IP address assigned by IAP 104 to that user's terminal 101. Furthermore, database 113 may also store the ANI of the calling terminal, provided by LEC 103, for purposes of billing transactions to a calling telephone number, as will be described in detail hereinafter. When the user ends his or her session on the Internet through IAP 104, which may consist of a single transaction with one ISP or a plurality of transactions with one or more ISPs, the IP address assigned to that user is made available by IAP 104 for subsequent use by another user that dials into that IAP.

The present invention provides for a centralized billing function for all types of chargeable transactions conducted by the user over the Internet. The user, in availing him or herself of the centralized billing functionality first establishes a desired billing mechanism with a billing platform 108, which consists of a transaction server 109 and associated database 110, and a billing server 111 and associated database 112. The transaction and billing servers 109 and 111 and their associated databases may be separated from each other or co-located, and in fact, may reside on a single computer system. As will be described in detail hereinafter, the transaction server 109 functions to temporarily record the transactions and associated charges attributable to the user as identified by the temporary IP address assigned to the user for use during a single session. The billing server 111 records the transactions and associated charges to be billed to an identified user to one or more designated accounts in accordance with the billing mechanism established by the user.

In establishing the billing mechanism the user interacts with the transaction server 109, which acts as a broker for the billing server 111. Specifically, the user provides his or her selected choices for how charges for transactions on the Internet are to be billed. These choices may include a specific credit card, an account associated with a telephone number, or a debit account to be billed. In addition, the user may specify that certain transactions, depending upon the type of transaction, be billed in a specific manner. Thus, the user may want all transactions involving purchases from a specified retailer to be billed to that retailer's own credit card, and other purchases to be billed to a bank credit card, such as MasterCard or VISA. Charges for transactions of a certain type for less than a predetermined amount may be designated for billing to an identified telephone account associated with the user. Charges for transactions for greater than some other predetermined amount may be designated for billing to an identified debit account.

After interacting with transaction server 109 to establish a desired billing mechanism, transaction server 109 passes the information to billing server 111 for storage on database 112. Billing server 111 thus has stored on database 112 for each user who has arranged for such centralized billing functionality a record that includes the parameters of billing and the billing choice. Table 1 shows an example of such a record.

TABLE 1

| User ID | Parameters | Billing Choice |
|---|---|---|
| John Smith smith.1234 | tangible goods ≦ $40.00 | Chase Debit Account 987-654-321 |
| | tangible goods > $40.00 | MasterCard Account 123-456-7890 |
| | information services | Telephone Account 201-555-1234 |
| | all purchases from Sears | Sears Account 444-333-777 |
| | software | VISA Account 999-222-666 |

The billing server also stores for each user a record that includes information for each transaction charged to that user's account. Table 2 shows an example of the type of transaction-oriented information stored in database 112 for each transaction associated with an identified user.

TABLE 2

User ID - smith.1234
date of transaction - 041596
ISP accessed - Dow Jones
Service used - stock report
account billed - telephone number 201-555-1234
charge - $.50
date of transaction - 041696
ISP accessed - Microsoft
Service used - download software
account billed - VISA Account 999-222-666
charge - $25.00

Assuming that the user at terminal 101 has established a billing mechanism that is resident on database 112 of billing server 111, billing to the centralized user's account on the billing server for transactions conducted by the user will be explained in conjunction with FIG. 1. In accordance with the present invention, the IP address assigned by IAP 104 to terminal 101 as an identifying address for use during the user's session is transmitted by IAP 104 to transaction server 109 together with the identity of the user, which is provided to the IAP during the initial handshaking and authentication procedures between the user and the IAP. Optionally, the user's ANI may also be transmitted within the message. The message containing the user's identity, the user's associated IP address, and optionally, the user's ANI, is transmitted to transaction server 109 over a private dedicated facility 114 if it is required for security protection or if sufficient traffic exists between IAP 104 and the centralized billing platform 108 for the plurality of different users simultaneously accessing the Internet through IAP 104. Alternatively, this information can be transmitted to transaction server 109 over a secured Internet link over transmission facilities 115 and 116, which are distinguished in FIG. 1 from non-secure Internet links by their thicker lead lines. When transmitted over a secured Internet link, the message is encapsulated in a manner well known in the art to prevent its content from being read by unauthorized persons or machines. Upon receiving the message from IAP 104, transaction server 109 creates an entry for the IP address in its database 110 for the session, which will be removed at the end of the session when the IP address is taken back by the IAP for use by another user.

Once an entry is created for the IP address in database 110 of transaction server 109, the user may interact with any desired ISP(s) to complete one or more transactions. The accessed ISP "recognizes" the user with whom it is dealing only by the user's IP address and is unaware of the actual identity of the user, whether the user has an established billing mechanism, and whether that IP address has created an entry in the centralized billing platform. Before completing the transaction, therefore, the accessed ISP, such as ISP 106, communicates with the transaction server 109 to determine whether that IP address has an established billing entry to which charges for the transaction can be forwarded and recorded. Such communication can take place over a dedicated private link 117 between ISP 106 and transaction server 109, or over a secured Internet link, over facilities 118 and 116, depending on security issues and the traffic statistics between ISP 106 and transaction server 109. Transaction server 109 is thus queried to ascertain whether an entry exists for the ISP address of the initiating user, and whether a billing mechanism is in place. If such an entry exists on database 110 and a billing mechanism is in place, ISP 106 is signaled over the secured link, to authorize the transaction. Once the transaction is completed by ISP 106, transaction server 109 is signaled by ISP 106 to bill the account associated with the IP address for the specific charges associated with the transaction.

Once the transaction has been completed, the user may remain with ISP 106 for additional transactions, which will be similarly billed to the account associated with the IP address stored on database 110 of transaction server 109. The user may, during the same session, access another ISP, such as ISP 107, for further transactions, which are similarly billed to the same account associated with the IP address assigned to the user for the session.

At some point the user terminates his or her session with IAP 104, which then releases that IP address for use by another user. At that time, IAP 104 notifies the transaction server 109 that the IP address is no longer in use. The transaction server 109 then sends to billing server 111, all the charges and associated transaction information for the account of the user who had been identified to transaction server 109 as being associated with that IP address for the just completed session. Billing server 111 associates each transaction within the session for billing in accordance with the billing mechanism established by the user, such as shown in Table 1 above. Each of the user's transactions is then recorded and stored in database 112, as shown in Table 2, above. The appropriate accounts in the various billing entities, 120-1–120-5, of VISA, MasterCard, etc., are then charged accordingly by means of messages transmitted over private facilities 120-1–120-5, or other transmission facilities, between the billing server 111 and these entities.

Billing to a user's telephone bill by collecting the ANI of the user can be effected for a casual user who has not established a billing mechanism with a centralized billing service, but who yet desires to interact with an ISP to complete chargeable transactions. For such a transaction, the IAP must collect the user's ANI when the IP address is assigned, which are both then passed in a message from the IAP 104 to the transaction server 109 to create an entry. The user, in engaging in such a transaction, dials a 900-number to access the IAP, knowing before-hand that charges for the conducted transaction(s) will be made against the calling ANI-identified telephone number. ISP 106, as in the embodiment described above, confirms the existence with the transaction server 109 of an entry with the IP address of the user before the transaction is completed. Once the user completes the transaction with ISP 106, ISP 106 signals transaction server 109 to bill the account associated with the IP address for the charges. At the end of the session, the charges billed to the account on database 110 of transaction server associated with the IP address are transmitted to billing server 111 together with the ANI associated with that IP address for billing to the user's telephone account.

Figure 2:
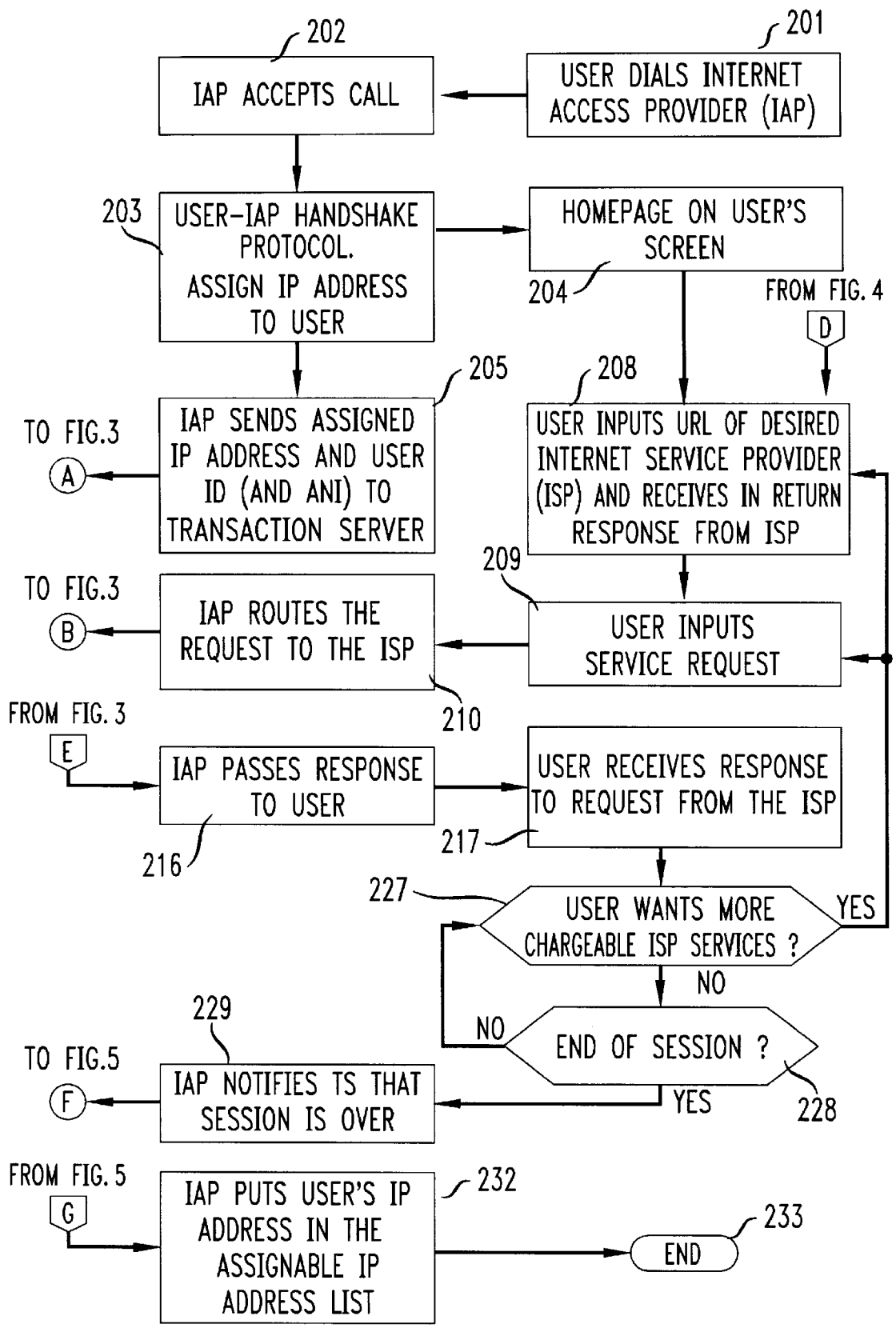

FIGS. 2–5 show the interactive steps between a user, the IAP, the ISP and the billing platform in providing centralized billing for transactions conducted over the Internet. In FIG. 2 at step 201 the user dials an IAP to obtain access to the Internet. At step 202 the IAP accepts the call and, at step 203, engages in a user-IAP handshake protocol in which the user's identity is provided and authenticated by the IAP as a valid subscriber to that IAP's access service. The IAP then assigns an IP address to the session for use by the user's terminal. At step 204, in response to a successful handshake, a home-page appears on the user's screen. In parallel, at step 205, the IAP sends the message to the transaction server that includes the assigned IP address and the user's identity. In response to that message, at step 206 (in FIG. 3), an entry is created in the database of the transaction server that associates the IP address with the user's ID for the current session. Also, at step 207, a determination is made whether the identified user has an already established billing mechanism in place with the billing server. The fact of whether a billing mechanism has or has not been established is added to the entry for that IP address on the transaction server, for purposes to the discussed hereinafter.

With reference back to FIG. 2, after receiving the homepage on his or her screen, the user, at step 208, inputs the URL address of the desired Internet Service Provider with which he or she is desires to conduct a transaction, and in response, receives a response from the ISP. At step 209, the user inputs a service request that will incur a transaction charge, such as requesting access to specific information, or requesting downloading of software. At step 210 the IAP routes the request to the ISP.

In FIG. 3, at step 211, the ISP retrieves the user's IP address and requests confirmation that an entry for a session has been created for that IP address on the database of the transaction server and that a billing mechanism has been established on the billing server for the user corresponding to that IP address. At step 212, at the transaction server, a database entry for that IP address and the presence of the billing mechanism are confirmed from the presence of an entry for that IP address and the inclusion in that entry of a marker indicating the existence of an established billing mechanism. At decision step 213 the presence of an entry for that IP address is confirmed. If no such entry exists for the IP address, at step 215 the ISP receives a non-confirmation signal and responds to the user, through the IAP, at steps 216 and 217. Without a confirmation, the user is precluded from proceeding with the transaction. If an entry for that IP address is confirmed at step 213, at decision step 214, the existence of a billing mechanism is confirmed from the presence of the indicating marker. If no billing mechanism has been established, then at step 218 (in FIG. 4), the ISP sends the user a URL to an HTML page for selecting a billing mechanism. As previously described, this billing mechanism will include the user's desired method or methods of billing, and any parameters that define when a particular billing method is to be applied. The user, at step 219, selects the desired billing mechanism, which is sent to the transaction server. At step 220, the transaction server sends the information to the billing server for permanent storage on its database, and at step 221, the transaction server updates the entry associated with that user's IP address to include a marker indicating that a billing mechanism has been established. At step 222, the user is notified that a billing mechanism has been established and that he or she can proceed with service requests. The process then returns to step 208 in FIG. 2, from which point the user may proceed to access the desired ISP.

At decision step 214, if the presence of a billing mechanism is confirmed, at step 223, the ISP receives confirmation from the transaction server and provides the requested service to the user, the latter including delivery of the requested information, the downloading of requested software, or a confirmation of an order. This response is passed through the IAP, at step 216 (in FIG. 2), to the user, who thereupon receives the response to the request at step 217.

In parallel with the ISP providing service to the user, at step 224 (in FIG. 3), the ISP signals the transaction server to bill the account associated with the IP address to which the ISP is providing service. At step 225, the transaction server bills that account for the charges for the provided service, and at step 226, the ISP receives confirmation that such account has been billed.

With reference FIG. 2, after the user receives the response to the request from the ISP at step 217, the user may decide, at step 227, to access additional chargeable ISP services from the same or a different ISP. If the user wants additional services, he or she returns to step 208 to input the URL of the desired ISP if a different ISP is desired, or to step 209 if further service from the same ISP is desired. If the user does not want any more chargeable ISP services, then at step 228, the user decides whether to terminate the session. If the user terminates the session, at step 229, the IAP, in response to the user's action to terminate, such as by logging-off, notifies the transaction server that the session is over. At step 230, in FIG. 5, the IP address is removed from the transaction server as an allowable chargeable account and, at step 231, billing for all the transactions associated with that IP address during the just completed session are sent to the billing server for billing to the account of the user who was associated with that IP address. At step 232 (in FIG. 2), thereafter, the IAP puts that IP address in a list of IP addresses that are available for assignment to subsequent users who access the IAP. The user-IAP-ISP-transaction server/billing server interactions for the session then end at step 233.

Figure 6:
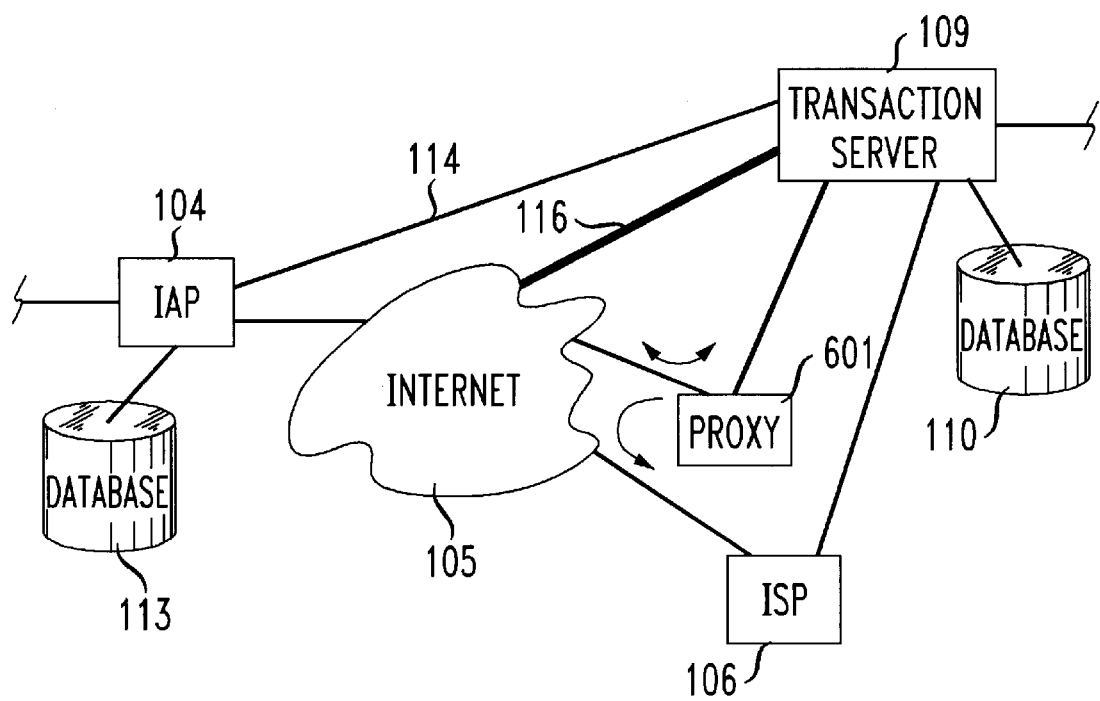
FIG. 6 shows a portion of FIG. 1, modified to prevent a user's account from being billed for non-requested transactions.

In order to ensure that an ISP request for billing is associated with an actual service request of a user, the embodiment of the invention of FIG. 1 is modified as shown in FIG. 6. In FIG. 6, only those network elements necessary to describe this modified embodiment are included and those elements common to both figures are given the same reference number. In accordance with this embodiment, a user may select, during the setup of the browser page, a mechanism that requires all transactions to pass through a proxy server, such as 601 in FIG. 6. That proxy server 601 acts as an agent of the transaction server 109 and every transaction that passes through the proxy 601 to an ISP, such as 106, is marked. That mark is used by the ISP when it forwards a message to the transaction server 109 to bill that IP address. The transaction server, therefore, must check for the presence of that mark within the message to bill a particular IP address. The relationship between the IP address and the mark is therefore communicated to transaction server 109 to enable transaction server 109 to verify each billing request from an ISP relative to that IP address. Thus, the database 110 associated with transaction server 109 is updated to include a notation that each billing request for that IP address must be checked for the presence of a mark.

That mark could also be used by IAP 104 to determine that a transaction was sent to the user by including it within the response of the ISP to the user. IAP 104 would therefore look for the mark within the response directed to the user's IP address and transmit a message to transaction server 109 noting a response was sent to the user. The transaction server 109 would therefore inhibit billing until receiving an affirmative acknowledgment from the IAP 104 of actual receipt. Thus a user will be billed only for services actually sent by an ISP.

An alternate modification of the present invention will provide confirmation to transaction server 109 that a transaction was successfully completed before billing is effected, thereby avoiding billing for requested services that did not reach the user. Specifically, in accordance with this embodiment, a program is included in the user's terminal 101 (in FIG. 1) that initiates transmission of a message to the transaction server 109 after the transaction has been completed. That program may be preloaded into the user's machine 101 or downloaded into the terminal together with the ISP response, and implemented, for example, as JAVA applets. The transaction server 109, after getting a billing request from the ISP 106, then waits for a confirmation message from the user's terminal 101 that indicates that the transaction has been completed. ISP 106, in sending the billing request to transaction server 109, thus includes with its message a marker recognizable by transaction server 109 that indicates that a confirmation message must come from the user's terminal before billing to the account associated with the user's IP address is effected.

The functions performed within the billing platform 108, as described above, could be distributed between the transaction server 109 and billing server 111, or other servers, in a manner different than described above. Also, although described in conjunction with a separate transaction server 109 and a billing server 111 that each have associated databases, the present invention could be implemented with a single server and associated database in which each transaction is billed to a user's account. In such an embodiment, the IP address associated with the transaction is immediately translated by the server to a user's account from the stored relationship between the identity of the user and the assigned IP address that is sent by the IAP to the server.

Although described in conjunction with providing billing for transactions conducted over the Internet between a user and a service provider, the present invention can be applied to provide centralized billing functionality for transactions conducted over any type of network in which the user is only recognizable to the service provider by an identifier temporarily assigned to the user for one or more transactions.

The above-described embodiments are illustrative of the principles of the present invention. Other embodiments could be devised by those skilled in the art without departing from the spirit and scope of the present invention.

The invention claimed is:

1. A method of billing an account associated with a user's identity for a cost for a transaction conducted on a network between a provider and a user's terminal, the user's terminal being assigned a temporary address on the network that is used for the transaction, said billing and said transaction both being conducted on said network, the method comprising the steps of:
   receiving an identifying signal that associated the user's identity and the assigned temporary address;
   storing the association between the user's identity and the assigned temporary address;
   receiving a billing signal to bill for the cost of the transaction, the billing signal including the cost of the transaction and the assigned temporary address of the terminal;
   referencing the cost of the transaction in the billing signal to the account associated with the user's identity from the stored association between the assigned temporary address and the user's identity; and
   billing the account associated with the user's identity for the cost of the transaction.

2. The method of claim 1 wherein the network is a data network.

3. The method of claim 2 wherein the data network is the Internet.

4. The method of claim 3 wherein the assigned temporary address is an Internet Protocol (IP) address.

5. The method of claim 1 further comprising, after the step of receiving the billing signal, the steps of determining whether the user has requested the transaction, and inhibiting billing of the account associated with the user's identity if the user has not requested the transaction.

6. The method of claim 1 further comprising, after the step of receiving the billing signal, the steps of determining whether the transaction was completed, and inhibiting billing of the account associated with the user's identity if the transaction was not completed.

7. The method of claim 1 further comprising, after the step of receiving the billing signal, the steps of determining whether the transaction was sent by the provider, and inhibiting billing of the account associated with the user's identity if the transaction was not sent.

8. The method of claim 4 wherein the provider is an Internet Service Provider (ISP) and the transaction involves providing the user with information.

9. The method of claim 4 wherein the provider is an Internet Service Provider (ISP) and the transaction involves providing the user with an interactive service.

10. The method of claim 4 wherein the provider is an Internet Service Provider (ISP) and the transaction involves ordering and receiving a non-tangible good in digital format by the user's terminal over the Internet.

11. The method of claim 10 wherein the non-tangible good is software.

12. The method of claim 1 further comprising the step of transmitting the cost of the transaction billed to the account associated with the user's identity to a billing entity for billing to the user in accordance with a billing mechanism established by the user.

13. The method of claim 12 wherein the billing entity is determined by the billing mechanism in accordance with the cost of the transaction.

14. The method of claim 12 wherein the billing entity is determined by the billing mechanism in accordance with the type of transaction.

15. The method of claim 12 wherein the billing entity is determined by the billing mechanism in accordance with the identity of the provider.

16. The method of claim 12 wherein the billing entity is determined as a function of the cost of the transaction, the type of transaction, and the identity of the provider.

17. The method of claim 1 wherein the identifying signal further associates the user's identity and the assigned temporary address with an Automatic Number Identification (ANI) associated with the user's terminal, and a telephone account associated with the ANI is billed for the cost of the transaction.

18. A method of conducting a transaction for which a charge is associated and billing of said charge on a network between a user's terminal and a provider comprising the steps of:
   assigning a temporary address on the network for use during the transaction by the user's terminal;
   receiving a request from the user's terminal for the transaction;
   receiving an identifying signal that associates a user's identity and the assigned temporary address;
   storing the association between the user's identity and the assigned temporary address;
   providing the user with a response to the request for the transaction;
   receiving a billing signal to bill for the cost of the transaction, the billing signal including the cost of the transaction and the assigned temporary address of the terminal requesting the transaction;
   referencing the cost of the transaction in the billing signal to an account associated with the user's identity from the stored association between the assigned temporary address and the user's identity; and billing the account associated with the user's identity for the cost of the transaction.

19. The method of claim 18 wherein the network is a data network.

20. The method of claim 19, wherein the data network is the Internet.

21. The method of claim 20 wherein the assigned temporary address is an Internet Protocol (IP) address.

22. The method of claim 18 further comprising, after the step of receiving the billing signal, the steps of determining whether the user has requested the transaction, and inhibiting billing of the account associated with the user's identity if the user has not requested the transaction.

23. The method of claim 18 further comprising, after the step of receiving the billing signal, the steps of determining whether the transaction has been completed, and inhibiting billing of the account associated with the user's identity if the transaction was not completed.

24. The method of claim 18 further comprising, after the step of receiving the billing signal, the steps of determining whether the transaction was sent by the provider, and inhibiting billing of the account associated with the user's identity if the transaction was not sent.

25. The method of claim 18 further comprising the step of transmitting the cost of the transaction billed to the account associated with the user's identity to a billing entity for billing to the user in accordance with a billing mechanism established by the user.

26. The method of claim 25 wherein the billing entity is determined by the billing mechanism in accordance with the cost of the transaction.

27. The method of claim 25 wherein the billing entity is determined by the billing mechanism in accordance with the type of transaction.

28. The method of claim 25 wherein the billing entity is determined by the billing mechanism in accordance with the identity of the provider.

29. The method of claim 25 wherein the billing entity is determined as a function of the cost of the transaction, the type of transaction, and the identity of the provider.

30. The method of claim 18 wherein the identifying signal further associates the user's identity and the assigned temporary address with an Automatic Number Identification (ANI) associated with the user's terminal, and a telephone account associated with the ANI is billed for the cost of the transaction.

31. A method of billing an account associated with a user's identity for the cost of one or more transactions within a session conducted on a network between one or more providers and a user's terminal, the user's terminal being assigned a temporary address on the network that is used for the session, said billing and said transactions both being conducted on said network, the method comprising the steps of:

receiving an identifying signal that associates the user's identity and the assigned temporary address for the session;

storing the association between the user's identity and the assigned temporary address;

receiving for each transaction within a session a billing signal to bill for the cost of the transaction, the billing signal including the cost of the associated transaction and the assigned temporary address of the terminal;

for each transaction within the session, billing an account associated with the temporary address of the terminal for the cost of the transaction;

referencing the account associated with the temporary address of the terminal to the account associated with the user's identity from the stored association between the assigned temporary address and the user's identity;

at the end of the session, billing the account associated with the user's identity for the one or more transactions within the session.

32. The method of claim 31 wherein the network is a data network.

33. The method of claim 32 wherein the data network is the Internet.

34. The method of claim 33 wherein the assigned temporary address is an Internet Protocol (IP) address.

35. The method of claim 31 further comprising, after the step of receiving for each transaction a billing signal, the steps of determining for each transaction within the session whether the user has requested the transaction, and inhibiting billing of the account associated with the temporary address if the user has not requested the transaction.

36. The method of claim 31 further comprising, after the step of receiving for each transaction a billing signal, the steps of determining for each transaction within the session whether the transaction has been completed, and inhibiting billing of the account associated with the temporary address if the transaction has not been completed.

37. The method of claim 31 further comprising, after the step of receiving for each transaction a billing signal, the steps of determining for each transaction within the session whether the transaction was sent by the provider, and inhibiting billing of the account associated with the temporary address if the transaction was not sent.

38. The method of claim 31 further comprising, for each transaction within the session, the step of transmitting the cost of the transaction to a billing entity for billing to the user in accordance with a billing mechanism established by the user.

39. The method of claim 38 wherein the billing entity is determined by the billing mechanism in accordance with the cost of each transaction within the session.

40. The method of claim 38 wherein the billing entity is determined by the billing mechanism in accordance with the type of each transaction within the session.

41. The method of claim 38 wherein the billing entity is determined by the billing mechanism in accordance with the identity of the provider providing each transaction within the session.

42. The method of claim 38 wherein the billing entity is determined by the billing mechanism as a function of the cost, the type, and the provider of each transaction within the session.

43. The method of claim 31 wherein the identifying signal further associates the user's identity and the assigned temporary address with an Automatic Number Identification (ANI) associated with the user's terminal, and a telephone account associated with the ANI is billed for the cost of at least one transaction within the session.

44. A method of billing an account associated with a user's identity for a cost for a transaction conducted on the Internet between an Internet Service Provider (ISP) and a user's terminal through an Internet Access Provider (IAP), the user's terminal being assigned an Internet Protocol (IP) address that is used for the transaction, the method comprising the steps of:

receiving an identifying signal from the IAP that associates the user's identity and the assigned IP address;

storing the association between the user's identity and the assigned IP address;

receiving a billing signal from the ISP to bill for the cost of the transaction, the billing signal including the cost of the transaction and the assigned IP address of the terminal;

referencing the cost of the transaction in the billing signal to the account associated with the user's identity from the stored association between the assigned IP address and the user's identity; and billing the account associated with the user's identity for the cost of the transaction.

45. The method of claim 44 further comprising, after the step of receiving the billing signal from the ISP, the steps of determining whether the user has requested the transaction, and inhibiting billing of the account associated with the user's identity being if the user has not requested the transaction.

46. The method of claim 44 further comprising, after the step of receiving the billing signal from the ISP, the steps of determining whether the transaction has been completed, and inhibiting billing of the account associated with the user's identity if the transaction has not been completed.

47. The method of claim 44 further comprising, after the step of receiving the billing signal, the steps of determining whether the transaction was sent by the ISP, and inhibiting billing of the account associated with the user's identity if the transaction was not sent.

48. The method of claim 44 further comprising the step of transmitting the cost of the transaction billed to the account associated with the user's identity to a billing entity for billing to the user in accordance with a billing mechanism established by the user.

49. The method of claim 48 wherein the billing entity is determined by the billing mechanism in accordance with the cost of the transaction.

50. The method of claim 48 wherein the billing entity is determined by the billing mechanism in accordance with the type of transaction.

51. The method of claim 48 wherein the billing entity is determined by the billing mechanism in accordance with the identity of the ISP.

52. The method of claim 48 wherein the billing entity is determined as a function of the cost of the transaction, the type of transaction, and the identity of the ISP.

53. The method of claim 44 wherein the identifying signal further associates the user's identity and the assigned temporary address with an Automatic Number Identification (ANI) associated with the user's terminal, and a telephone account associated with the ANI is billed for the cost of the transaction.

* * * * *